(12) United States Patent
Lee et al.

(10) Patent No.: US 8,790,825 B2
(45) Date of Patent: Jul. 29, 2014

(54) NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(75) Inventors: Young-Jun Lee, Yongin-si (KR);
Goo-Jin Jeong, Yongin-si (KR);
Young-Hwan Kim, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 668 days.

(21) Appl. No.: 12/835,575

(22) Filed: Jul. 13, 2010

(65) Prior Publication Data
US 2011/0086271 A1    Apr. 14, 2011

(30) Foreign Application Priority Data
Oct. 14, 2009   (KR) .................. 10-2009-0097761

(51) Int. Cl.
*H01M 4/134*  (2010.01)
*H01M 4/36*   (2006.01)
*H01M 4/38*   (2006.01)

(52) U.S. Cl.
USPC ..................... 429/218.1; 252/182.1

(58) Field of Classification Search
USPC ..................... 252/182.1; 429/218.1
See application file for complete search history.

(56) References Cited

U.S. PATENT DOCUMENTS

| | | | |
|---|---|---|---|
| 2003/0215711 A1* | 11/2003 | Aramata et al. ........... | 429/218.1 |
| 2006/0147797 A1 | 7/2006 | Wu et al. | |
| 2007/0122701 A1 | 5/2007 | Yamaguchi | |
| 2008/0003503 A1 | 1/2008 | Kawakami et al. | |
| 2009/0075173 A1 | 3/2009 | Jeong et al. | |
| 2009/0136851 A1 | 5/2009 | Choi et al. | |
| 2009/0162750 A1* | 6/2009 | Kawakami et al. ........ | 429/218.1 |

FOREIGN PATENT DOCUMENTS

| | | |
|---|---|---|
| CN | 1513922 A | 7/2004 |
| EP | 2204867 A1 | 7/2010 |
| JP | 2005-071655 | 3/2005 |
| JP | 2006-190642 | 7/2006 |
| JP | 2007-141666 A | 6/2007 |
| JP | 2008-016446 A | 1/2008 |
| JP | 2009-135094 | 6/2009 |

(Continued)

OTHER PUBLICATIONS

Korean Notice of Allowance issued by KIPO dated Sep. 30, 2011, 5 pages.

(Continued)

*Primary Examiner* — Gregg Cantelmo
(74) *Attorney, Agent, or Firm* — Knobbe, Martens, Olson & Bear, LLP

(57) ABSTRACT

Disclosed are a negative active material for a rechargeable lithium battery that includes a core including silicon oxide represented by the following Chemical Formula 1; and a surface-treatment layer surrounding the core and including metal oxide represented by the following Chemical Formula 2, a method of preparing the negative active material, and a rechargeable lithium battery including the negative active material. The metal of the metal oxide is included in an amount of about 0.1 wt % to about 20 wt % based on the total weight of the negative active material for a rechargeable lithium battery.

$SiO_x$  [Chemical Formula 1]

$M_yO_z$  [Chemical Formula 2]

In the above Chemical Formula 1 and 2, M, x, y, and z are the same as defined in the specification.

26 Claims, 4 Drawing Sheets

(56) References Cited

FOREIGN PATENT DOCUMENTS

| | | |
|---|---|---|
| JP | 2009-164104 A | 7/2009 |
| KR | 100277796 | 10/2000 |
| KR | 1020050016126 | 2/2005 |
| KR | 1020070056323 | 6/2007 |
| KR | 10-2009-0028986 A | 3/2009 |
| KR | 10-2009-0053660 A | 5/2009 |
| WO | WO 2009/031715 A1 | 12/2009 |

OTHER PUBLICATIONS

Extended European Search Report issued by the European Patent Office dated Feb. 7, 2011, 6 pages.

T. Zhang, J. Gao, H.P. Zhang, L.C. Yang, Y.P. Wu, H.Q. Wu, Preparation and electrochemical properties of core-shell Si/SiO nanocomposite as anode material for lithium ion batteries, Electrochemistry Communications, 2007, pp. 886-890, vol. 9, Department of Chemistry and Shanghai Key Laboratory of Molecular Catalysis and Innovative Materials, Fudan University, Shanghai 200433, China.

Japanese Office Action issued by the Japanese Patent Office dated Jun. 5, 2012.

Office Action dated received in connection with Chinese Patent Application No. 201010511837.4.

Office Action issued on Sep. 24, 2013 by the European Patent Office in corresponding European Application No. 10251783.6 in three pages.

Japanese Notice of Allowance dated Jul. 23, 2013, issued in connection with corresponding Japanese Patent Application No. 2010-045369.

Second Chinese Office Action dated Aug. 8, 2013, issued in connection with corresponding Chinese Patent Application No. 201010511837.4.

Decision of Rejection issued on Nov. 4, 2013 by the State Intellectual Property Office of P.R. China, in Chinese Application No. 201010511837.4, with translation, in 20 pages.

\* cited by examiner

NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATIONS

This application claims priority to and the benefit of Korean Patent Application No. 10-2009-0097761 filed in the Korean Intellectual Property Office on Oct. 14, 2009, the entire contents of which are incorporated herein by reference.

BACKGROUND OF THE INVENTION

1. Field of the Invention

This disclosure relates to a negative active material for a rechargeable lithium battery, a method of preparing the same, and a rechargeable lithium battery including the same.

2. Description of the Related Art

Lithium rechargeable batteries have recently drawn attention as a power source of small portable electronic devices. They use an organic electrolyte solution and thereby have twice the discharge voltage of a conventional battery using an alkali aqueous solution, and accordingly have high energy density.

For positive active materials of a rechargeable lithium battery, lithium-transition element composite oxides being capable of intercalating lithium such as $LiCoO_2$, $LiMn_2O_4$, $LiNi_{1-x}Co_xO_2$ ($0<x<1$), and so on have been generally used.

As for negative active materials of a rechargeable lithium battery, various carbon-based materials such as artificial graphite, natural graphite, and hard carbon, which can all intercalate and deintercalate lithium, have been used. However, recently there has been research into non-carbon-based negative active materials such as Si in accordance with need for stability and high-capacity.

SUMMARY OF THE INVENTION

One aspect of this disclosure provides a negative active material for a rechargeable lithium battery having improved thermal stability and cycle-life characteristics.

Another aspect of this disclosure provides a method of preparing the negative active material.

Yet another aspect of this disclosure provides a rechargeable lithium battery including the negative active material.

According to one aspect of this disclosure, a negative active material for a rechargeable lithium battery is provided that includes a core including silicon oxide represented by the following Chemical Formula 1; and a surface-treatment layer surrounding the core and including metal oxide represented by the following Chemical Formula 2. The metal of the metal oxide is included in an amount of 0.1 to 20 wt % based on the total weight of the negative active material for a rechargeable lithium battery.

$SiO_x$        [Chemical Formula 1]

In the above Chemical Formula 1, $0<x<2$.

$M_yO_z$        [Chemical Formula 2]

In the above Chemical Formula 2, M is a metal including aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof, $0<y<5$, and $0<z<20$.

In particular, the metal of the metal oxide is included in an amount of 1 to 5 wt % based on the total weight of the negative active material for a rechargeable lithium battery. The surface-treatment layer has a thickness of 0.001 μm to 1 μm.

The core may include silicon nanocrystal, and herein, the core may have a 2theta of a diffraction peak on an Si (111) face ranging from about 0.1 degree to about 3 degree in an X-ray diffraction analysis (CuK α), and x may be 0.5≤x≤1.5 in the above Chemical Formula 1. Also, the core may have a specific surface area of about 1 m²/g to about 10 m²/g.

The negative active material may have XPS peak, which represents Si—O binding energy, ranging from about 99 eV to about 110 eV in X-ray photoelectron spectroscopy (XPS) analysis. Herein, the negative active material may have a ratio ($E_1/E_0$) of Si—O binding energy $E_1$ of the negative active material to Si—O binding energy $E_0$ of the core ranging from about 1.005 to about 1.02, and the negative active material may have an average particle size ranging from about 0.1 μm to about 100 μm.

According to another embodiment, a negative active material for a rechargeable lithium battery includes a core including a silicon oxide represented by the following Chemical Formula 1; and a surface-treatment layer surrounding the surface of the core and including a metal oxide represented by the following Chemical Formula 2. Herein, an XPS peak representing Si—O binding energy ranges from about 99 eV to about 110 eV in X-ray photoelectron spectroscopy (XPS) analysis.

$SiO_x$        [Chemical Formula 1]

In the above Chemical Formula 1, $0<x<2$.

$M_yO_z$        [Chemical Formula 2]

In the above Chemical Formula 2, M is a metal including aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof, $0<y<5$, and $0<z<20$.

Particularly, the negative active material may have a ratio ($E_1/E_0$) of the Si—O binding energy $E_1$ of the negative active material to the Si—O binding energy $E_0$ of the core ranging from about 1.005 to about 1.02 in a photoelectron spectroscopy (XPS) analysis. The metal of the metal oxide may be included in an amount of about 0.1 wt % to about 20 wt % based on the total weight of the negative active material for a rechargeable lithium battery, and the core may include silicon nanocrystal. Herein, the core may have a 2theta of a diffraction peak on a Si 111 face ranging from about 0.1 degree to about 3 degree in an X-ray diffraction analysis (CuK α) and x may be 0.5≤x≤1.5 in the above Chemical Formula 1. Also, the core may have a specific surface area ranging from about 1 m²/g to about 10 m²/g.

The surface-treatment layer may have a thickness ranging from about 0.001 μm to about 1 μm, and the negative active material may have an average particle size ranging from about 0.1 μm to about 100 μm.

Yet another embodiment provides a method for preparing a negative active material for a rechargeable lithium battery, which includes: preparing silicon oxide powder represented by the following Chemical Formula 1; preparing a metal oxide precursor by mixing metal or metal alkoxide with water or organic solvent; and mixing the silicon oxide powder and the metal oxide precursor in the air atmosphere or reduction atmosphere, and performing a heat treatment.

$SiO_x$ [Chemical Formula 1]

In the above Chemical Formula 1, 0<x<2.

In the metal and the metal alkoxide, the metal includes aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof.

The silicon oxide powder may include silicon nanocrystal, and the heat treatment may be performed at a temperature of about 400° C. to 900° C.

Still another embodiment provides a method for preparing a negative active material for a rechargeable lithium battery, which includes: preparing silicon oxide powder represented by the following Chemical Formula 1; coating the silicon oxide powder with a metal oxide; and performing a heat treatment onto the silicon oxide coated with the metal oxide in the air atmosphere or reduction atmosphere.

$SiO_x$ [Chemical Formula 1]

In the above Chemical Formula 1, 0<x<2.

The metal oxide includes an oxide of a metal selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof.

The silicon oxide powder may include silicon nanocrystal, and the heat treatment may be performed at a temperature of about 400° C. to about 900° C.

Further another embodiment provides a rechargeable lithium battery including a positive electrode including a positive active material, a negative electrode including a negative active material, and an electrolyte between the positive electrode and the negative electrode, and the negative active material is the negative active material for a rechargeable lithium battery disclosed in the embodiments of this disclosure.

Hereinafter, further aspects of the present embodiments will be described in detail.

The negative active material for a rechargeable lithium battery shows excellent thermal stability and cycle-life characteristics.

DETAILED DESCRIPTION OF THE INVENTION

Figure 1:
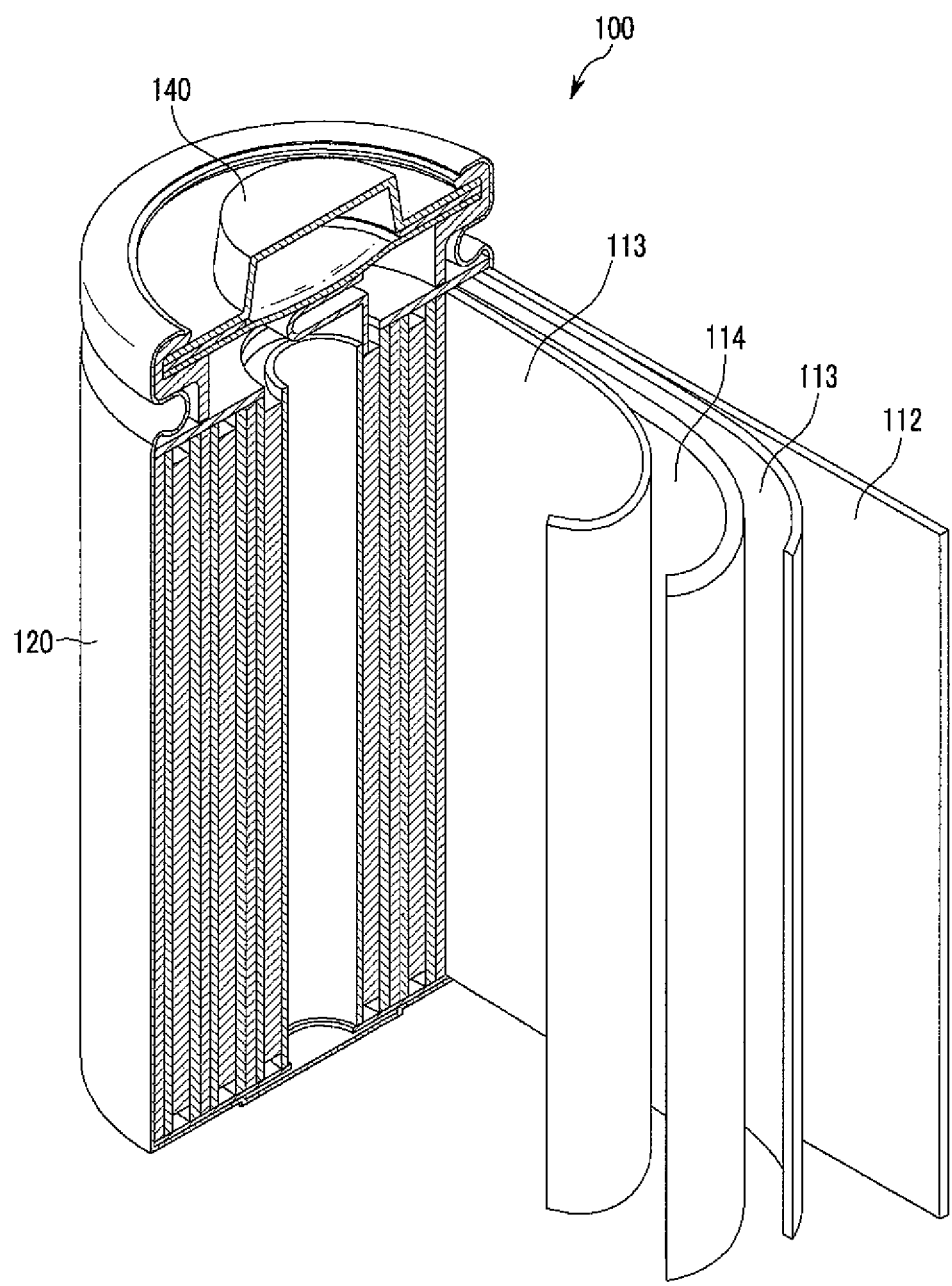
FIG. 1 is a schematic view of a rechargeable lithium battery according to one embodiment.

Exemplary embodiments will hereinafter be described in detail. However, these embodiments are only exemplary, and the present embodiments are not limited thereto.

The negative active material for a rechargeable lithium battery according to one embodiment includes a core including a silicon oxide represented by the following Chemical Formula 1; and a surface-treatment layer surrounding the core and including a metal oxide represented by the following Chemical Formula 2. The metal of the metal oxide is included in an amount of from about 0.1 wt % to about 20 wt % based on the total weight of the negative active material for a rechargeable lithium battery. Particularly, when the metal oxide includes metal in the above content range, the rechargeable lithium battery may have high capacity and excellent cycle-life characteristic even if it is charged/discharged at a high voltage. In some embodiments, the metal oxide may include metal in a content of from about 1 wt % to about 5 wt %, and in other embodiments, it may include metal in a content of from about 1 wt % to about 3 wt % based on the total weight of the negative active material for a rechargeable lithium battery.

$SiO_x$ [Chemical Formula 1]

In the above Chemical Formula 1, 0<x<2. In some embodiments, when x is 0.5≤x≤1.5, the volume of the rechargeable lithium battery is properly expanded and contracted during charge and discharge, and high capacity may be efficiently maintained.

$M_yO_z$ [Chemical Formula 2]

In the above Chemical Formula 2, M is a metal including, for example, aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof, 0<y<5, and 0<z<20.

The negative active material may have an improved high temperature stability by employing a surface-treatment layer including a metal oxide represented by the above Chemical Formula 2. In some embodiments, M may be aluminum (Al), titanium (Ti), magnesium (Mg), zirconium (Zr) or a combination thereof.

Also, the negative active material may have an XPS (X-ray photoelectron spectroscopy) peak representing a Si—O binding energy appearing in from about 99 eV to about 110 eV in the X-ray photoelectron spectroscopic (XPS) analysis. In some embodiments, the negative active material may have a ratio ($E_1/E_0$) of the Si—O binding energy $E_1$ of the negative active material to the Si—O binding energy $E_0$ of the core of from about 1.005 to about 1.02.

Another embodiment of this disclosure provides a negative active material for a rechargeable lithium battery which includes a core including a silicon oxide represented by the above Chemical Formula 1; and a surface-treatment layer surrounding the surface of the core and including a metal oxide represented by the above Chemical Formula 2. Herein, an XPS peak representing Si—O binding energy ranges from about 99 eV to about 110 eV in X-ray photoelectron spectroscopy (XPS) analysis. Particularly, the negative active material may have a ratio ($E_1/E_0$) of the Si—O binding energy $E_1$ of the negative active material to the Si—O binding energy $E_0$ of the core of from about 1.005 to about 1.02. When the physical property of the negative active material is out of the range, high-capacity and the improved cycle-life characteristic are not achieved.

Also, the metal oxide may include a metal in a content of from about 0.1 wt % to about 20 wt % based on the total weight of the negative active material for a rechargeable lithium battery, in some embodiments, the content may be from about 1 wt % to about 5 wt %, and in other embodiments, the content may be from about 1 wt % to about 3 wt %.

Hereafter, the negative active material for a rechargeable lithium battery according to one embodiment will be described in detail.

The core may have an average particle size of from about 0.1 μm to about 100 μm. Herein, the core may exist in the form of a single particle having an average particle size of the above range. Also, the core may exist in a form of a silicon oxide having an identical particle diameter or a silicon oxide having different particle diameters mixed or combined therein.

Also, the core may include silicon nanocrystal. The core may have a 2 theta value of a diffraction peak of a Si (111) face of from about 0.1° to about 3° in the X-ray diffraction analysis using CuK α ray (Rigaku Corporation, Chiyoda-ku, Tokyo, Japan). When outside of this range, the high temperature stability is deteriorated.

In some embodiments, the core may have a specific surface area of from about 1 $m^2/g$ to about 10 $m^2/g$. When the core has a specific surface area of the range, a side reaction with the electrolyte may be suppressed, and high-capacity and excellent cycle-life characteristic may be efficiently achieved.

When the surface-treatment layer has a thickness of from about 0.001 μm to about 1 μm, high temperature stability may be effectively improved.

Also, the negative active material for a rechargeable lithium battery may have an average particle size of from about 0.1 μm to about 100 μm. When the average particle size of the negative active material is out of the range, the cycle-life characteristic is deteriorated.

Another embodiment of this disclosure provides a method for preparing a negative active material for a rechargeable lithium battery, which includes preparing a silicon oxide powder represented by the above Chemical Formula 1; preparing a metal oxide precursor by mixing metal or metal alkoxide with water or an organic solvent; and mixing the silicon oxide powder and the metal oxide precursor in the air atmosphere or a reduction atmosphere, and performing a heat treatment.

In the metal and the metal alkoxide, the metal may include, for example, aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof. The alkoxide may include, for example, $C_1$ to $C_{30}$ alkoxide, $C_1$ to $C_{20}$ alkoxide, or $C_1$ to $C_{10}$ alkoxide. Examples of the alkoxide include methoxide, ethoxide, propoxide, iso propoxide, butoxide, and the like, but are not limited thereto.

The organic solvent may include $C_1$ to $C_{10}$ alcohol, $C_1$ to $C_{10}$ ketone, or a combination thereof, but is not limited thereto. Examples of the alcohol include ethanol, propanol, isopropyl alcohol, butanol, n-butanol, and the like, examples of the ketone include acetone, methylethylketone, methylbutylketone, and the like, but are not limited thereto.

The metal may be mixed with the water or the organic solvent in an amount of from about 1 to about 10 wt % based on the total weight of the water or the organic solvent including the metal or the metal alkoxide.

For example, when alcohol is used as the organic solvent, the metal alkoxide is dissolved well in the alcohol to thereby easily form a metal alkoxide sol.

Another embodiment of this disclosure provides a method for preparing a negative active material for a rechargeable lithium battery, which includes: preparing silicon oxide powder represented by the above Chemical Formula 1; coating the silicon oxide powder with a metal oxide; and performing a heat treatment onto the silicon oxide coated with the metal oxide in the air atmosphere or reduction atmosphere.

The metal oxide includes an oxide of a metal, for example, aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof.

The coating process may be performed through a mechano fusion method, a chemical vapor deposition (CVD) method, a sputtering method, a precipitation method, a filtering method, and a vacuum drying method, but is not limited thereto.

Hereafter, a method for preparing a negative active material for a rechargeable lithium battery according to one embodiment will be described.

In the method for preparing a negative active material for a rechargeable lithium battery, the silicon oxide powder may include silicon nanocrystal. In this embodiment, the XRD diffraction characteristic of the nanocrystal is the same as described in the above in the discussion of the negative active material for a rechargeable lithium battery.

Also, the other characteristic of the silicon oxide and the metal oxide are as described above in the discussion of the negative active material for a rechargeable lithium battery.

Also, the heat treatment may be performed at a temperature of from about 400° C. to about 900° C. Herein, a drying process may be additionally performed at a temperature of from about 100° C. to about 150° C. for from about 2 hours to about 10 hours. The heat treatment may be performed after the drying process, or the heat treatment may be performed by decreasing the temperature to room temperature and then increasing the temperature to from about 400° C. to about 900° C. The heat treatment time may be appropriately controlled according to the heat treatment temperature, and the heat treatment may be performed within the temperature range for from about 8 hours to about 15 hours.

The reduction atmosphere refers to an atmosphere where the negative active material for a rechargeable lithium battery may be reduced. The reduction atmosphere is not limited to a specific kind, but general reduction atmospheres used in the art, e.g., nitrogen ($N_2$) gas atmosphere, hydrogen ($H_2$) gas atmosphere, argon (Ar) gas atmosphere, and vacuum atmosphere may be used to perform the heat treatment. Also, Super P® (Timcal Graphite and Carbon, Bodio, Switzerland) may be used as a carbon source during the heat treatment and this may cause a reduction atmosphere may be formed.

Another embodiment of this disclosure provides a rechargeable lithium battery, which includes a positive electrode including a positive active material, a negative electrode including a negative active material, and an electrolyte between the positive electrode and the negative electrode, and the negative active material is the negative active material for a rechargeable lithium battery provided according to embodiments of this disclosure.

The negative electrode includes a current collector and a negative active material layer formed on the current collector. The negative active material layer includes the negative active material according to one embodiment.

The negative active material layer includes a binder, and selectively a conductive material.

The binder improves binding properties of the negative active material particles to one another, and also with a current collector. Examples of the binder include at least one of polyvinyl alcohol, carboxylmethyl cellulose, hydroxypropyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; and mixtures thereof.

The current collector may be, for example, a copper foil, a nickel foil, a stainless steel foil, a titanium foil, a nickel foam, a copper foam, a polymer substrate coated with a conductive metal, and combinations thereof.

The positive electrode includes a current collector and a positive active material layer disposed on the current collector. The positive active material includes lithiated intercalation compounds that reversibly intercalate and deintercalate lithium. The positive active material may include a composite oxide including at least one of cobalt, manganese, nickel, and lithium. In particular, the following are examples of the lithium-containing compounds that may be used:

$Li_aA_{1-b}D_bE_2$ (wherein, in the above Chemical Formula, $0.90 \leq a \leq 1.8$, and $0 \leq b \leq 0.5$);

$Li_aG_{1-b}D_bO_{2-c}J_c$ (wherein, in the above Chemical Formula, $0.90 \leq a \leq 1.8$, $0 \leq b \leq 0.5$, and $0 \leq c \leq 0.05$);

$LiG_{2-b}D_bO_{4-c}J_c$ (wherein, in the above Chemical Formula, $0 \leq b \leq 0.5$, and $0 \leq c \leq 0.05$);

$Li_aNi_{1-b-c}Co_bD_cE_\alpha$ (wherein, in the above Chemical Formula, $0.90 \leq a \leq 1.8$, $0 \leq b \leq 0.5$, $0 \leq c \leq 0.05$, and $0 < \alpha \leq 2$); $Li_aNi_{1-b-c}Co_bD_cO_{2-\alpha}J_\alpha$ (where in the above Chemical Formula, $0.90 < a < 1.8$, $0 \leq b \leq 0.5$, $0 \leq c \leq 0.05$, and $0 < \alpha < 2$);

$Li_aNi_{1-b-c}Co_bD_cO_{2-\alpha}J_2$ (wherein, in the above Chemical Formula, $0.90 \leq a \leq 1.8$, $0 \leq b \leq 0.5$, $0 \leq c \leq 0.05$, and $0 < \alpha < 2$);

$Li_aNi_{1-b-c}Mn_bD_cE_\alpha$ (wherein, in the above Chemical Formula, $0.90 \leq a \leq 1.8$, $0 \leq b \leq 0.5$, $0 \leq c \leq 0.05$, and $0 < \alpha \leq 2$);

$Li_aNi_{1-b-c}Mn_bD_cO_{2-\alpha}J_\alpha$ (wherein, in the above Chemical Formula, $0.90 \leq a < 1.8$, $0 \leq b \leq 0.5$, $0 \leq c \leq 0.05$, and $0 < \alpha < 2$);

$Li_aNi_{1-b-c}Mn_bD_cO_{2-\alpha}J_2$ (wherein, in the above Chemical Formula, $0.9 \leq a \leq 1.8$, $0 \leq b \leq 0.5$, $0 \leq c \leq 0.05$, and $0 < \alpha < 2$);

$Li_aNi_bG_cL_dO_2$ (wherein, in the above Chemical Formula, $0.90 \leq a \leq 1.8$, $0 \leq b \leq 0.9$, $0 \leq c \leq 0.5$, and $0.001 \leq d \leq 0.1$);

$Li_aNi_bCo_cMn_dL_eO_2$ (wherein, in the above Chemical Formula, $0.90 \leq a \leq 1.8$, $0 \leq b \leq 0.9$, $0 \leq c \leq 0.5$, $0 \leq d \leq 0.5$, and $0.001 \leq e \leq 0.1$);

$Li_aNiL_bO_2$ (wherein, in the above Chemical Formula, $0.90 \leq a \leq 1.8$, and $0.001 \leq b \leq 0.1$);

$Li_aCoL_bO_2$ (wherein, in the above Chemical Formula, $0.90 \leq a \leq 1.8$, and $0.001 \leq b \leq 0.1$);

$Li_aMnL_bO_2$ (wherein, in the above Chemical Formula, $0.90 \leq a \leq 1.8$, and $0.001 \leq b \leq 0.1$);

$Li_aMn_2L_bO_4$ (wherein, in the above Chemical Formula, $0.90 \leq a \leq 1.8$, and $0.001 \leq b \leq 0.1$); $QO_2$; $QS_2$; $LiQS_2$; $V_2O_5$; $LiV_2O_5$; $LiRO_2$; $LiNiVO_4$; $Li_{(3-f)}Z_2(PO_4)_3 (0 \leq f \leq 2)$; $Li_{(3-f)}Fe_2(PO_4)_3 (0 \leq f \leq 2)$; and $LiFePO_4$.

In the above Chemical Formulae, A is selected from the group consisting of nickel (Ni), cobalt (Co), manganese (Mn) and a combination thereof; D is selected from the group consisting of aluminum (Al), nickel (Ni), cobalt (Co), manganese (Mn), chromium (Cr), iron (Fe), magnesium (Mg), strontium (Sr), vanadium (V), a rare earth element, and a combination thereof; E is selected from the group consisting of oxygen (O), fluorine (F), sulfur (S), phosphorus (P) and a combination thereof; G is selected from the group consisting of cobalt (Co), manganese (Mn), and a combination thereof; J is selected from the group consisting of fluorine (F), sulfur (S), phosphorus (P), and a combination thereof; L is selected from the group consisting of aluminum (Al), chromium (Cr), manganese (Mn), iron (Fe), magnesium (Mg), lanthanum (La), cerium (Ce), strontium (Sr), vanadium (V) and a combination thereof; Q is selected from the group consisting of titanium (Ti), molybdenum (Mo), manganese (Mn), and a combination thereof; R is selected from the group consisting of chromium (Cr), vanadium (V), iron (Fe), scandium (Sc), yttrium (Y), and a combination thereof; Z is selected from the group consisting of vanadium (V), chromium (Cr), manganese (Mn), cobalt (Co), nickel (Ni), copper (Cu), and a combination thereof. The positive active material is not limited thereto.

The above compound may have a coating layer on the surface, or may be mixed with another compound having a coating layer. The coating layer may include at least one coating element compound such as an oxide of a coating element, a hydroxide of a coating element, an oxyhydroxide of a coating element, an oxycarbonate of a coating element, and a hydroxyl carbonate of a coating element. The compound for a coating layer may be amorphous or crystalline. The coating element for a coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr) or a mixture thereof. The coating layer may be formed in a method having no adverse influence on properties of a positive active material by including these elements in the compound. For example, the method may include any coating method such as spray coating, dipping, and the like.

The positive active material layer may also include a binder and a conductive material.

The binder improves binding properties of the positive active material particles to one another, and also with a current collector. Examples of the binder include at least one of polyvinyl alcohol, carboxylmethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; and mixtures thereof.

In some embodiments, the current collector may be Al, but is not limited thereto.

The negative and positive electrodes may be fabricated by a method including mixing the active material, a conductive material, and a binder into an active material composition and coating the composition on a current collector. In some embodiments, the solvent may be N-methylpyrrolidone, but is not limited thereto.

In a rechargeable lithium battery according to one embodiment, a non-aqueous electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on, and examples of the aprotic solvent include nitriles such as R—CN (wherein R is a $C_2$ to $C_{20}$ linear, branched, or cyclic hydrocarbon, a double bond, an aromatic ring, or an ether bond), amides such as dimethylformamide, dioxolanes such as 1,3-dioxolane, sulfolanes, and so on.

The non-aqueous organic solvent may be used alone or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of from about 1:1 to about 1:9, and when the mixture is used as an electrolyte, the electrolyte performance may be enhanced.

In addition, the electrolyte of the present embodiments may further include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may be represented by the following Chemical Formula 3.

[Chemical Formula 3]

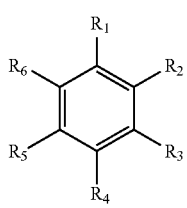

In the above Chemical Formula 3, $R_1$ to $R_6$ are independently hydrogen, a halogen, a $C_1$ to $C_{10}$ alkyl, a $C_1$ to $C_{10}$ haloalkyl, or a combination thereof.

The aromatic hydrocarbon-based organic solvent may include, but is not limited to, at least one of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include vinylene carbonate or an ethylene carbonate-based compound of the following Chemical Formula 4.

[Chemical Formula 4]

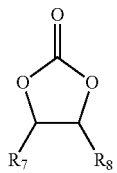

In the above Chemical Formula 4, $R_7$ and $R_8$ are independently hydrogen, a halogen, a cyano (CN), a nitro ($NO_2$), and a $C_1$ to $C_5$ fluoroalkyl, provided that at least one of $R_7$ and $R_8$ is a halogen, a nitro ($NO_2$), or a $C_1$ to $C_5$ fluoroalkyl and $R_7$ and $R_8$ are not simultaneously hydrogen.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt supplies lithium ions in the battery, operates a basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalate borate, LiBOB). The lithium salt may be used at from about 0.1 M to about 2.0 M concentration. When the lithium salt is included at the above concentration range, electrolyte performance and lithium ion mobility may be enhanced due to optimal electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size.

FIG. 1 is a schematic view of a representative structure of a rechargeable lithium battery. FIG. 1 illustrates a cylindrical rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120. The negative electrode 112, positive electrode 114, and separator 113 are sequentially stacked, spirally wound, and placed in a battery case 120 to fabricate such a rechargeable lithium battery 100.

The following examples illustrate the present embodiments in more detail. These examples, however, should not in any sense be interpreted as limiting the scope of the present embodiments.

EXAMPLES

Example 1

Fabrication of Negative Electrode

A core including a silicon oxide ($SiO_x$, $0<x<2$) having an average particle diameter of about 5 μm by co-depositing a silicon (Si) and silica ($SiO_2$) was prepared. The core had a 2theta of a diffraction peak of a Si 111 face of 1.9 degree in an X-ray diffraction analysis using a CuK α ray.

Subsequently, an aluminum isopropoxide solution was prepared by dissolving about 7.6 g of aluminum isopropoxide powder in about 50 g of ethanol. The core of about 99 g was impregnated in the aluminum isopropoxide solution and mixed and agitated by using an agitator to thereby evenly coat the core with aluminum isopropoxide.

The acquired product was dried at about 120° C. for about 5 hours in the atmosphere of nitrogen ($N_2$), and went through a heat treatment at about 700° C. for about 10 hours to thereby prepare a negative active material. Through the heat treatment, a negative active material including the core surrounded by an aluminum oxide as a surface-treatment layer was prepared. The above prepared negative active material included aluminum in a content of about 1 wt %.

A negative active material slurry was prepared by mixing the negative active material, a polyvinylidene fluoride binder and a carbon black conductive material in a ratio of about 80:10:10 wt % in N-methylpyrrolidone solvent. A negative electrode was fabricated through a typical electrode fabrication process of coating a Cu-foil current collector with the negative active material slurry.

2) Fabrication of Positive Electrode

A positive active material slurry was prepared by mixing $LiCoO_2$ positive active material, a polyvinylidene fluoride binder and a carbon black conductive material in N-methylpyrrolidone solvent. Herein, the mixing ratio of the positive active material, the binder and the conductive material was about 94:3:3 wt %. A positive electrode was fabricated through a typical electrode fabrication process of coating an Al-foil current collector with the positive active material slurry.

A rechargeable lithium battery cell was fabricated through a typical process by using the positive electrode, the negative electrode and a non-aqueous electrolyte. As for the non-aqueous electrolyte, a mixed solvent (volume ratio=3/3/4) of 1 M of $LiPF_6$ dissolved in EC/DEC/EMC (ethylene carbonate/diethylene carbonate/ethylmethyl carbonate) was used.

Example 2

A negative electrode and a positive electrode were fabricated according to the same method as Example 1, except that about 23 g of aluminum isopropoxide powder, about 70 g of ethanol and about 97 g of the core were used. The above prepared negative active material included aluminum in a content of about 3 wt %.

Example 3

A negative electrode and a positive electrode were fabricated according to the same method as Example 1, except that about 38 g of aluminum isopropoxide powder, about 100 g of ethanol and about 95 g of the core were used. The above prepared negative active material included aluminum in a content of about 5 wt %.

Example 4

A negative electrode and a positive electrode were fabricated according to the same method as Example 1, except that about 76 g of aluminum isopropoxide powder, about 150 g of ethanol and about 90 g of the core were used. The above prepared negative active material included aluminum in a content of about 10 wt %.

Example 5

A negative electrode and a positive electrode were fabricated according to the same method as Example 1, except that about 152 g of aluminum isopropoxide powder, about 500 g of ethanol and about 80 g of the core were used. The above prepared negative active material included aluminum in a content of about 20 wt %.

Example 6

Fabrication of Negative Electrode

A core including a silicon oxide was prepared according to the same method as Example 1.

About 99 g of the core powder was dip coated by using aluminum isopropoxide sol (methoxide sol) prepared by refluxing about 50 g of isopropyl alcohol and about 1 g of aluminum. Then, a negative active material was prepared by drying the coated core power at about 120° C. for about 5 hours in the atmosphere of nitrogen ($N_2$), and performing a heat treatment at about 700° C. for about 10 hours. Through the heat treatment, a negative active material including the core surrounded by an aluminum oxide as a surface-treatment layer was prepared. The above prepared negative active material included aluminum in a content of about 1 wt %.

2) Fabrication of Positive Electrode

A positive electrode was fabricated according to the same method as Example 1.

Example 7

A negative electrode and a positive electrode were fabricated according to the same method as Example 6, except that about 97 g of the core powder, about 50 g of isopropyl alcohol and about 3 g of aluminum were used. The above prepared negative active material included aluminum in a content of about 3 wt %.

Example 8

A negative electrode and a positive electrode were fabricated according to the same method as Example 6, except that about 95 g of the core powder, about 50 g of isopropyl alcohol and about 5 g of aluminum were used. The above prepared negative active material included aluminum in a content of about 3 wt %.

Example 9

A negative electrode and a positive electrode were fabricated according to the same method as Example 6, except that about 90 g of the core powder, about 50 g of isopropyl alcohol and about 10 g of aluminum were used. The above prepared negative active material included aluminum in a content of about 10 wt %.

Example 10

A negative electrode and a positive electrode were fabricated according to the same method as Example 6, except that about 80 g of the core powder, about 50 g of isopropyl alcohol and about 20 g of aluminum were used. The above prepared negative active material included aluminum in a content of about 20 wt %.

Comparative Example 1

A negative electrode and a positive electrode were fabricated according to the same method as Example 1, except that about 167 g of aluminum isopropoxide powder, about 500 g of ethanol and about 78 g of the core were used. The above prepared negative active material included aluminum in a content of about 22 wt %.

Comparative Example 2

A negative electrode and a positive electrode were fabricated according to the same method as Example 1, except that a core which was fabricated according to Example 1, included a silicon oxide, and was not surface-treated was used as a negative active material.

Experimental Example 1

X-Ray Photoelectron Spectroscopic (XPS) Analysis

X-ray photoelectron spectroscopic (XPS) analysis was performed onto the negative active materials for a rechargeable lithium battery prepared according to Examples 1 to 5, Comparative Examples 1 and 2. Among them, XPS analysis results of the negative active materials prepared according to Examples 1 and 3, and Comparative Example 2 were shown in the following Table 1 and FIG. 2.

TABLE 1

|  | Si—O binding energy (eV) | $E_1/E_0$ |
|---|---|---|
| Example 1 | 102.8 | 1.007 |
| Example 3 | 103.6 | 1.015 |
| Comparative Example 2 | 102.1 | 1 |

Figure 2:
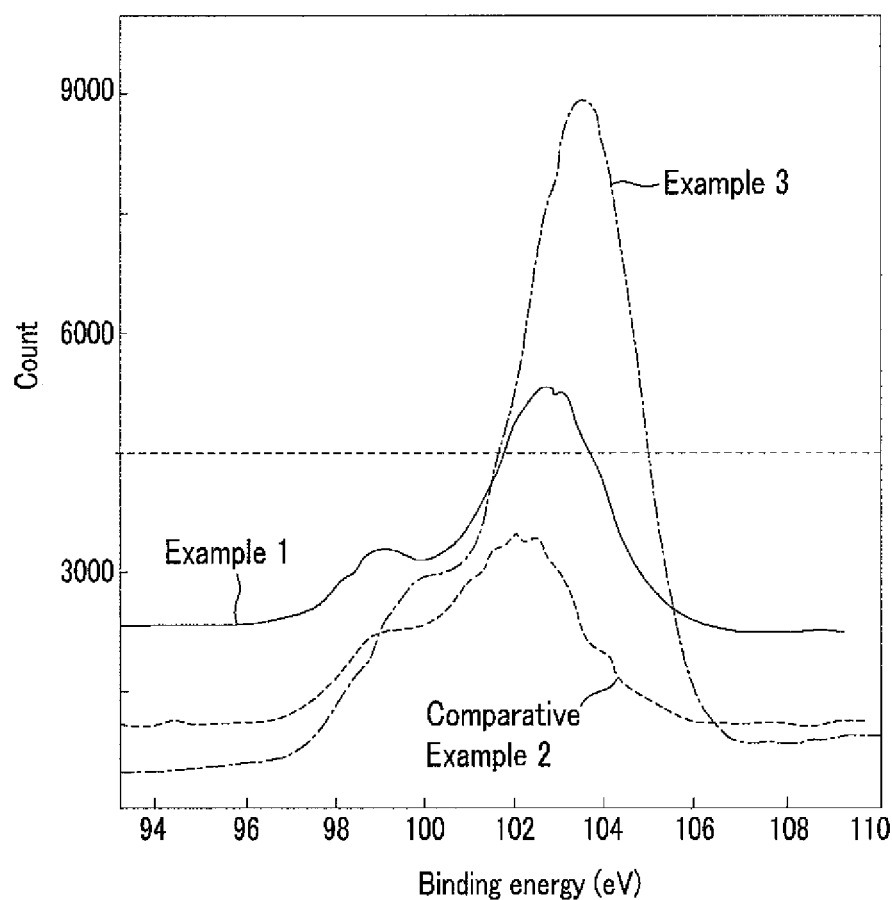
FIG. 2 presents X-ray photoelectron spectroscopy analysis (XPS) data of the negative active materials for a rechargeable lithium battery prepared according to Examples 1 and 3 and Comparative Example 2.

$E_1/E_0$: a ratio of Si—O binding energy $E_1$ of negative active material with respect to Si—O binding energy $E_0$ of core including silicon oxide Referring to Table 1 and FIG. 2, the negative active materials for a rechargeable lithium battery layer prepared according to Example 1 and Example 3, which include a surface-treatment layer, have an increased Si—O binding energy, compared to the negative active material prepared according to Comparative Example 2, which does not include a surface-treatment layer. It may be seen from the result that the aluminum-oxygen-silicon binding energy is increased and the oxidation degree of Si existing on the surface is increased.

Experimental Example 2

Si Elution Volume and Electrode Plate Resistance Analysis

Si elution volumes of negative active materials for a rechargeable lithium battery prepared according to Examples 1 to 5, and Comparative Examples 1 and 2 were measured using an inductively coupled plasma atomic emission spectrometer (ICP-AES) Ultima (produced by the Jobin Yvom Company) after impregnation in an electrolyte.

Also, electrode plate resistances of the negative electrodes for a rechargeable lithium battery fabricated according to Examples 1 to 5, and Comparative Examples 1 and 2 were measured using a surface conductivity measurer MCP-T6000 (produced by the Mitsubish Chemical Company (Tokyo, Japan).

Figure 3:
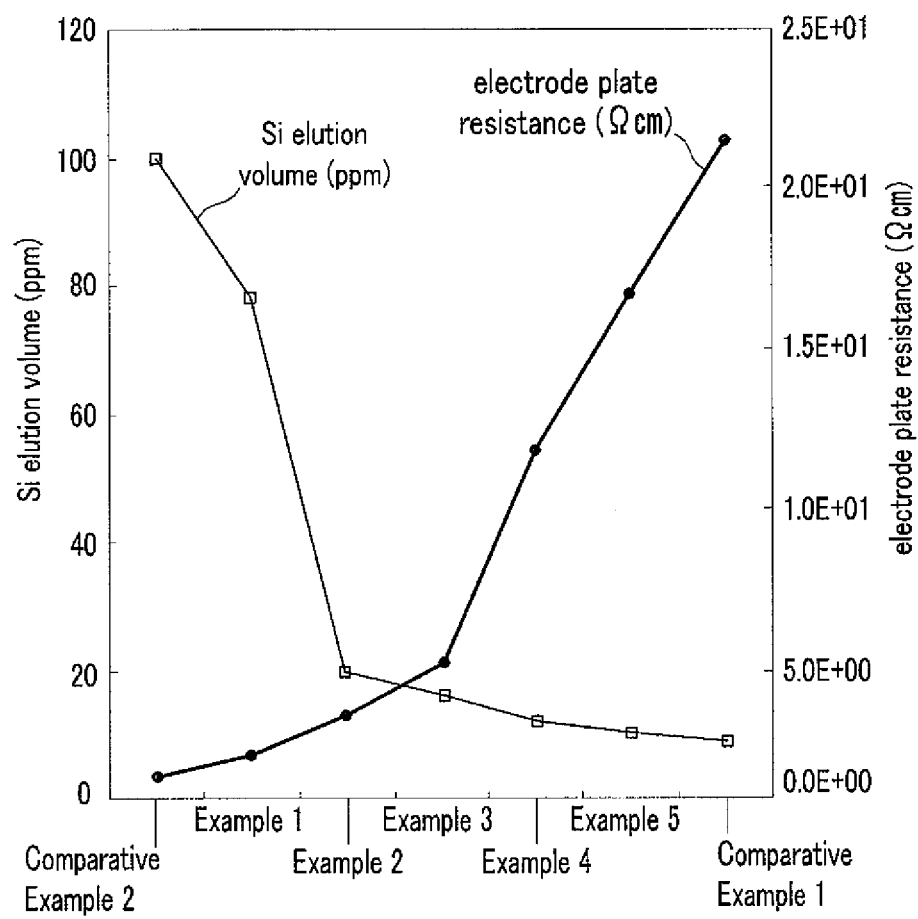
FIG. 3 is a graph showing Si elution volumes and electrode plate resistances of the rechargeable lithium batteries manufactured according to Examples 1 to 5, Comparative Examples 1 and 2.

The result was as shown in FIG. 3.

Referring to FIG. 3, the negative active materials for a rechargeable lithium battery prepared according to Examples 1 to 5, which include a surface-treatment layer, may efficiently control Si elution based on the bonding between the Si on the surface of the core and the metal oxide of the surface-treatment layer, compared to the negative active material for a rechargeable lithium battery prepared according to Comparative Example 2, which does not include a surface-treatment layer. Therefore, it is possible to efficiently prevent the Si of the core from contacting HF generated in the electrolyte. The Si elution may cause a capacity decrease at a room temperature and high temperature and gas generation, which leads to deteriorated battery characteristics.

In case of Comparative Example 1 where the coating amount of the metal oxide surface-treatment layer is increased too much, the Si elution volume is decreased but the electrode plate resistance is increased too high, which is problematic.

Experimental Example 3

Assessment of Thermal Stability 563443 prismatic battery cells were fabricated through a typical method by using the negative active materials for a rechargeable lithium battery prepared according to Example 2 and Comparative Example 2. The prismatic battery cells were put into a hot box set at about 150° C. and the variations in voltage and temperature according to time were measured. The results were as shown in FIG. 4.

Figure 4:
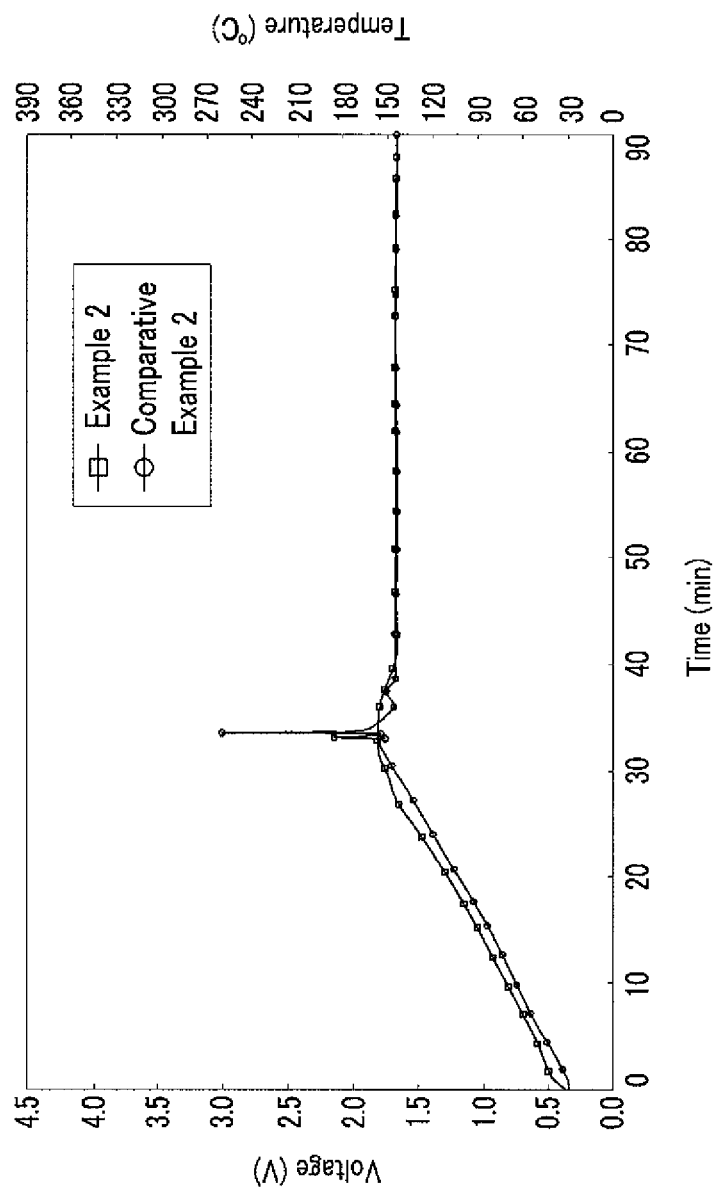
FIG. 4 is a graph showing thermal stability assessment results of the rechargeable lithium batteries manufactured according to Example 2 and Comparative Example 2.

Referring to FIG. 4, the battery cell using the negative active material prepared according to Example 2, which includes a surface-treatment layer, does not have a thermal runaway caused by heat generation at a high temperature of about 150° C. However, the battery cell using the negative active material prepared according to Comparative Example 2, which does not include a surface-treatment layer, has a thermal runaway reaction in several minutes after the temperature reaches about 150° C. It may be seen from the results that the thermal stability of a negative active material is improved by the coating of a surface-treatment layer.

Experimental Example 4

Assessment of Cycle Life Characteristic 2016 coin-type half cells were fabricated by using the negative active materials for a rechargeable lithium battery prepared according to Examples 1 to 5, Comparative Examples 1 and 2, and their cycle-life characteristics at a room temperature and a high temperature were assessed.

The cycle-life characteristics were assessed by performing charge and discharge at about 25° C. with about 0.5 C in about 50 times, and a discharge capacity retention after about 50 cycles were shown in the following Table 2.

Also, the cycle-life characteristics were assessed by performing charge and discharge at about 60° C. with about 0.5 C in about 50 times, and a discharge capacity retention after about 50 cycles were shown in the following Table 2.

TABLE 2

|  | Discharge capacity retention after 50 cycles (room temperature 25° C., 0.5 C) (%) | Discharge capacity retention after 50 cycles (high temperature of 60° C., 0.5 C) (%) |
| --- | --- | --- |
| Example 1 | 80 | 68 |
| Example 2 | 87 | 72 |
| Example 3 | 85 | 77 |
| Example 4 | 79 | 72 |
| Example 5 | 64 | 60 |
| Comparative Example 1 | 48 | 44 |
| Comparative Example 2 | 52 | 50 |

Referring to Table 2, the battery cells including the negative active materials prepared according to Examples 1 to 5, which include a surface-treatment layer, have excellent cycle-life characteristics, compared to the battery cell including the negative active material prepared according to Comparative Example 2, which does not include a surface-treatment layer. However, the battery cell including the negative active material prepared according to Comparative Example 1 has a lower discharge capacity retention than that of Comparative Example 2 due to an increased electrode plate resistance originating from an increased surface treatment amount.

While this disclosure has been described in connection with what is presently considered to be practical exemplary embodiments, it is to be understood that the present embodiments are not limited to the disclosed embodiments, but, on the contrary, is intended to cover various modifications and equivalent arrangements included within the spirit and scope of the appended claims.

What is claimed is:

1. A negative active material for a rechargeable lithium battery, comprising
an innermost core consisting essentially of a silicon oxide represented by Chemical Formula 1;

$$SiO_x$$ [Chemical Formula 1]

wherein 0<x<2;
and
a surface-treatment layer surrounding the innermost core and including a metal oxide represented by Chemical Formula 2,
wherein, the metal of the metal oxide is included in an amount of from about 0.1 wt % to about 20 wt % based on the total weight of the negative active material for a rechargeable lithium battery:

$$M_yO_z$$ [Chemical Formula 2]

wherein M is aluminum (Al),
0<y<5, and
0<z<20;
wherein the negative active material has a ratio ($E_1/E_0$) of a Si—O binding energy $E_1$ of the negative active material to a Si—O binding energy $E_0$ of the core of from about 1.005 to about 1.02 in an X-ray photoelectron spectroscopic (XPS) analysis.

2. The negative active material of claim 1, wherein the metal of the metal oxide is included in an amount of from about 1 wt % to about 5 wt % based on the total weight of the negative active material for a rechargeable lithium battery.

3. The negative active material of claim 1, wherein the surface-treatment layer has a thickness of from about 0.001 μm to about 1 μm.

4. The negative active material of claim 1, wherein the core includes silicon nanocrystal.

5. The negative active material of claim 1, wherein the core has a full width at half maximum at 2θ of a diffraction peak of a Si (111) face of from about 0.1° to about 3° in an X-ray diffraction analysis (CuK α).

6. The negative active material of claim 1, wherein 0.5≤x≤1.5.

7. The negative active material of claim 1, wherein the core has a specific surface area of from about 1 m²/g to about 10 m²/g.

8. The negative active material of claim 1, wherein the negative active material has an XPS peak representing Si—O binding energy appearing in a range of from about 99 eV to about 110 eV in an X-ray photoelectron spectroscopic (XPS) analysis.

9. The negative active material of claim 1, wherein the negative active material has an average particle size of from about 0.1 μm to about 100 μm.

10. A negative active material for a rechargeable lithium battery, comprising:
an innermost core consisting essentially of a silicon oxide represented by Chemical Formula 1;

$$SiO_x$$ [Chemical Formula 1]

wherein 0<x<2;
and
a surface-treatment layer surrounding a surface of the innermost core and including a metal oxide represented by Chemical Formula 2,
wherein an XPS peak representing an Si—O binding energy appears in a range of about 99 eV to about 110 eV in an X-ray photoelectron spectroscopic (XPS) analysis:

$$M_yO_z$$ [Chemical Formula 2]

wherein, M is aluminum (Al),
0<y<5, and
0<z<20;
wherein the negative active material has a ratio ($E_1/E_0$) of a Si—O binding energy $E_1$ of the negative active material to a Si—O binding energy $E_0$ of the core of from about 1.005 to about 1.02 in an X-ray photoelectron spectroscopic (XPS) analysis.

11. The negative active material of claim 10, wherein the metal oxide includes a metal in a content of from about 0.1 wt % to about 20 wt % based on a total weight of the negative active material for a rechargeable lithium battery.

12. The negative active material of claim 10, wherein the surface-treatment layer has a thickness of from about 0.001 μm to about 1 μm.

13. The negative active material of claim 10, wherein the core includes silicon nanocrystal.

14. The negative active material of claim 10, wherein the core has a full width at half maximum at 2θ of a diffraction peak of a Si (111) face of from about 0.1° to about 3° in an X-ray diffraction analysis (CuK α).

15. The negative active material of claim 10, wherein 0.5≤x≤1.5.

16. The negative active material of claim 10, wherein the core has a specific surface area of from about 1 $m^2$/g to about 10 $m^2$/g.

17. The negative active material of claim 10, wherein the negative active material has an average particle size of from about 0.1 μm to about 100 μm.

18. A method for preparing a negative active material for a rechargeable lithium battery, comprising:
   preparing a silicon oxide powder represented by Chemical Formula 1;

$SiO_x$  [Chemical Formula 1]

wherein 0<x<2.
   preparing a metal oxide precursor by mixing a metal or a metal alkoxide with water or an organic solvent; and
   mixing the silicon oxide powder and the metal oxide precursor in air atmosphere or a reduction atmosphere, and performing a heat treatment.

19. The method of claim 18, wherein the metal comprises one selected from the group consisting of aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), and a combination thereof.

20. The method of claim 18, wherein the silicon oxide powder includes silicon nanocrystal.

21. The method of claim 18, wherein the heat treatment is performed at a temperature of from about 400° C. to about 900° C.

22. A method for preparing a negative active material for a rechargeable lithium battery, comprising:
   preparing a silicon oxide powder represented by Chemical Formula 1;

$SiO_x$  [Chemical Formula 1]

wherein 0<x<2.
   coating the silicon oxide powder with a metal oxide; and
   performing a heat treatment onto the silicon oxide coated with the metal oxide in air atmosphere or reduction atmosphere.

23. The method of claim 22, wherein the metal oxide comprises oxide of a metal selected from the group consisting of aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), and a combination thereof.

24. The method of claim 22, wherein the silicon oxide powder includes silicon nanocrystal.

25. The method of claim 22, wherein the heat treatment is performed at a temperature of from about 400° C. to about 900° C.

26. A rechargeable lithium battery, comprising:
   a positive electrode including a positive active material, a negative electrode including the negative active material according to claim 1, and an electrolyte between the positive electrode and the negative electrode.

* * * * *